(12) United States Patent
Kempeneers et al.

(10) Patent No.: US 6,687,450 B1
(45) Date of Patent: Feb. 3, 2004

(54) BREAK-OUT DEVICE

(75) Inventors: Dirk Kempeneers, Aarschot (BE); Luiz Neves Mendez, Begijnendijk (BE); Lodewijk von Noten, Leuven (BE); Philippe Kalmes, Hasselt (BE); Sam Leeman, Leuven (BE); Johan Legrand, Nieuwrode (BE); Jos Vandepoel, Halen (BE)

(73) Assignee: Tyco Electronics Raychem NV (BE)

( * ) Notice: Subject to any disclaimer, the term of this patent is extended or adjusted under 35 U.S.C. 154(b) by 0 days.

(21) Appl. No.: 10/009,666

(22) PCT Filed: May 15, 2000

(86) PCT No.: PCT/GB00/01864

§ 371 (c)(1),
(2), (4) Date: Mar. 29, 2002

(87) PCT Pub. No.: WO00/72073

PCT Pub. Date: Nov. 30, 2000

(51) Int. Cl.$^7$ .................................................. G02B 6/02
(52) U.S. Cl. .................................................... 385/135
(58) Field of Search .............................. 385/134, 135, 385/136, 137

(56) References Cited

U.S. PATENT DOCUMENTS

| | | | |
|---|---|---|---|
| 4,737,010 A | | 4/1988 | Le Maitre et al. .......... 350/96.2 |
| 4,795,230 A | | 1/1989 | Garcia et al. ............ 350/96.2 |
| 5,146,532 A | * | 9/1992 | Hodge ..................... 385/136 |
| 5,412,497 A | * | 5/1995 | Kaetsu et al. ............. 398/164 |
| 5,458,019 A | * | 10/1995 | Trevino ................... 74/502.4 |
| 5,471,555 A | | 11/1995 | Braga et al. .............. 385/136 |
| 5,566,269 A | * | 10/1996 | Eberle et al. ............. 385/137 |
| 6,249,636 B1 | * | 6/2001 | Daoud ..................... 385/137 |
| 6,456,772 B1 | * | 9/2002 | Daoud ..................... 385/135 |
| 6,567,601 B2 | * | 5/2003 | Daoud et al. .............. 385/135 |

FOREIGN PATENT DOCUMENTS

| | | |
|---|---|---|
| DE | 197 26 500 | 1/1998 |
| EP | 0 498 599 | 8/1992 |
| HU | P9602574 | 10/1997 |
| HU | 216983 | 10/1999 |
| HU | 218817 | 12/2000 |
| JP | 08149649 | 7/1996 |
| WO | WO 91/12548 | 8/1991 |
| WO | WO 95/22071 A3 | 8/1995 |
| WO | WO 95/22071 A2 | 8/1995 |
| WO | WO 97/38338 | 10/1997 |

OTHER PUBLICATIONS

Copy of PCT Search Report for PCT/GB00/01864.
Copy of British Search Report for GB 9911612.1 dated Nov. 16, 1999.
Copy of British Search Report for GB 9911612.1 dated Feb. 17, 2000.

* cited by examiner

*Primary Examiner*—Tulsidas Patel
(74) *Attorney, Agent, or Firm*—Myers Bigel Sibley & Sajovec

(57) ABSTRACT

Break-out devices are provided for longitudinally extending elements. The break-out devices include a base member and a pair of ribs extending from the base member that define a longitudinally extending channel configured to receive the longitudinally extending elements therebetween. The inner sides of each of the pair of the ribs may include one or more longitudinally extending slots defining pairs of slots. A removable partition is inserted into the channel to provide a through-hole dimensioned to receive one or more of the longitudinally extending elements. The removable partition may be inserted in one of the pairs of slots. The partition may include a locking mechanism that retains the partition in the channel. Methods for organizing optical fiber elements using such break-out devices are also provided.

27 Claims, 2 Drawing Sheets

BREAK-OUT DEVICE

RELATED APPLICATIONS

The present application is a National Phase application of PCT/GB00/01864 filed on May 15, 2000 and published in English, which claims priority from Application GB 9911612.1 filed on May 19, 1999 and Application GB 0010281.4 filed on Apr. 28, 2000.

FIELD OF THE INVENTION

The present invention relates to a break-out device for optical fibre cables. More in particular, the present invention relates to a break-out device which can be used to organise optical fibre elements, such as optical fibres and/or optical fibre carrier tubes, at a cable termination.

BACKGROUND OF THE INVENTION

Break-out devices, sometimes also called organisers, are well known in the field of optical fibre management. WO 91/12548, for example, discloses a cable termination for use with slotted core optical fibre cables. The break-out part of this Prior Art cable termination has a plurality of circumferentially arranged through-holes of a predetermined size. The through-holes are provided with passages leading to the circumference of the break-out part to allow "wrap-around" installation of the optical fibres, that is, side-entry of the fibres. This feature allows uncut fibres to be accommodated and eliminates the need for threading the fibres through the relatively small through-holes. The side-entry feature of this known break-out does however require the material of the break-out to be bent. While this may be perfectly feasible for small diameter optical fibres, it may constitute difficulties when larger diameter optical fibre cables and optical fibre carrier tubes are involved.

SUMMARY OF THE INVENTION

It is therefore an object of the present invention to eliminate the disadvantages of the Prior Art and to provide a break-out device which is also suitable for larger diameter optical fibre elements.

It is another object of the present invention to provide a break-out device which is particularly suitable for accommodating optical fibre carrier tubes.

It is a further object of the present invention to provide a break-out device which is adaptable to the particular diameter of the optical fibre elements to be accommodated.

It is a yet further object of the present invention to provide a break-out device which has a high capacity.

It is a still further object of the present invention to provide a break-out device which allows optical fibre elements of various dimensions to be accommodated.

Accordingly, a break-out device for optical fibre cables is according to the present invention characterised by one or more channels for accommodating optical fibre elements and one or more partitions insertable in the channels so as to define through-holes having a substantially closed circumference.

By providing through-holes which are constituted by channels laterally closed off by partitions it is possible to first insert the optical fibre element in the channel and then insert the partition so as to enclose the optical fibre element. The installation of the optical fibre elements in the break-out device is even further facilitated if the channels, prior to the insertion of a partition, are open to one side. This allows side-entry of the optical fibre elements.

An even greater capacity is obtained when at least one channel is arranged for the insertion of at least two partitions so as to define at least two parallel through-holes. This also provides the possibility of inserting only one partition in a channel where two could have been inserted, resulting in a through-hole having a greater (e.g. doubled) width. Thus by selectively inserting partitions in channels which provide plural insertion options an increased flexibility is obtained and optical fibre elements of various dimensions may be accommodated.

In a preferred embodiment the channels are defined by substantially parallel ribs protruding from a base plate. Advantageously, the sides of the ribs facing the channels are provided with slots for accommodating the partitions.

To provide a secure structure a locking mechanism is provided for locking the partitions in their inserted positions, thus preventing the inserted partitions from inadvertently leaving the channels. Preferably, the locking mechanism is releasable.

The locking mechanism may be constituted in various ways. Preferably, each partition is provided with at least one protrusion and each channel is provided with a recess or opening for accepting the protrusion in the inserted position. It could be envisaged, however, that the channels were provided with protrusions and that the partitions were provided with recesses.

To provide sufficient resilience to allow the protrusions to pass through the channels, each partition is preferably provided with a longitudinal slit near the at least one protrusion. Preferably, each partition has a single protrusion located in a corner of its body, and the slit is located near that corner. It is, however, possible for each partition to have two or even more protrusions.

To accept the protrusions in the inserted position of the partitions, an opening or recess is provided in the channels, as stated above. In a preferred embodiment, the opening divides each channel into a slotted part and a non-slotted part. That is, each channel extends beyond the recess to provide further support for the optical fibre elements but only part of the channel is capable of receiving partitions. This arrangement provides additional support without requiring the partitions to be longer than necessary.

Advantageously, the break-out device is provided with mounting hooks for mounting the device on a support.

The invention further provides a kit-of-parts for forming a break-out device as defined above, and a partition for use in such a break-out device.

BRIEF DESCRIPTION OF THE DRAWINGS

The present invention will further be explained with reference to exemplary embodiments illustrated in the accompanying drawings, in which.

DETAILED DESCRIPTION OF THE ILLUSTRATED EMBODIMENTS

Figure 1:
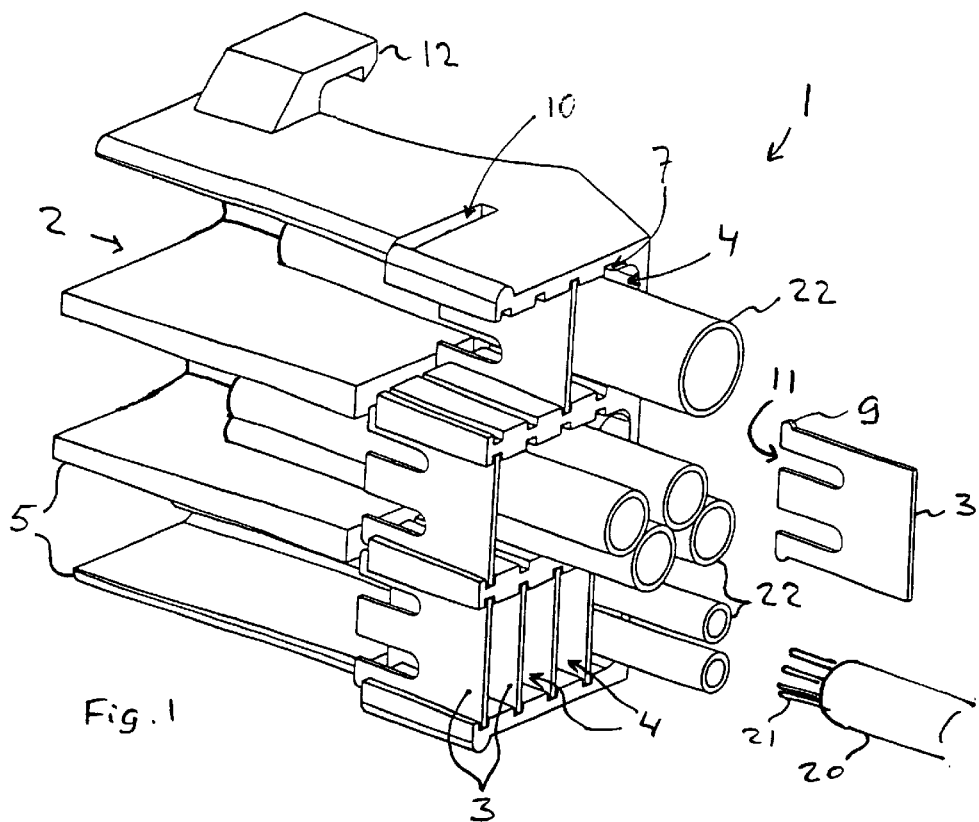
FIG. 1 shows, in perspective, a first embodiment of a break-out device according to the present invention.

The break-out device 1 shown by way of non-limiting example in FIG. 1 comprises a number of ribs 5 protruding from a base plate 6. Each pair of ribs constitutes a channel 2 in which fibre optic elements, such as carrier tubes 22, can be accommodated.

In the embodiment shown, the top and bottom walls of each channel 2, that is, the sides of the ribs 5 facing the channels, are each provided with four grooves or slots 7 for accepting partitions 3. It will be understood that the actual number of slots may vary depending on the particular requirements and on the relative dimensions of the device 1 and the optical fibre elements 22. The number of slots per channel wall may therefore also equal one, two, three, five or more than five. It is to be understood that the slots 7 may be provided as grooves in the sides of the ribs 5 facing the channels as shown in FIG. 1 or may be paired ridges extending into the channels from the sides of the ribs 5.

The device 1 is provided with a locking mechanism to keep the inserted partitions 3 in place. For this purpose the partitions are each provided with one or more protrusions 9 which, when inserted, are accepted in the openings 10. Instead of the openings 10, grooves or recesses could be made in the ribs 5. To provide the resilience required to easily insert the partitions, they are each provided with one or more slits 11 in the side near the protrusion(s) 9.

The openings 10 divide each channel 2 into a slotted part where the partitions 3 can be inserted and a non-slotted part which serves to further support the optical fibre elements. When the optical fibre elements 22 are carrier tubes, as shown in FIG. 1, they preferably end approximately halfway along the non-slotted part of the channels. This provides a protected transition for any optical fibres emerging from the carrier tubes 22.

Mounting hooks 12 serve to mount the device 1 on a suitable support, such as a fibre organiser plate in a cable splice closure.

Figure 2:
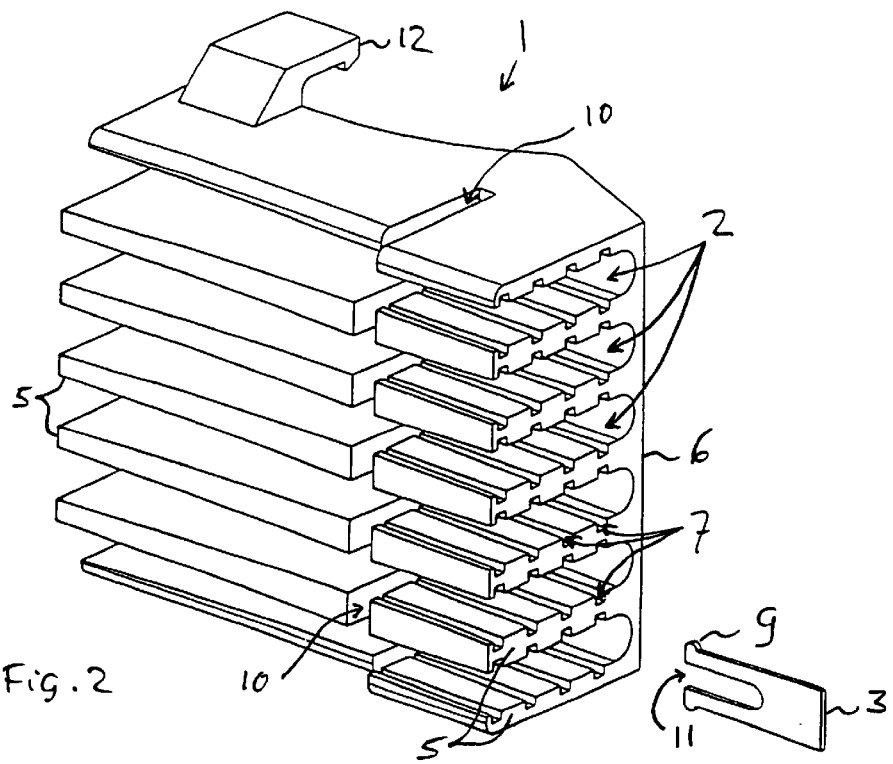
FIG. 2 shows, in perspective, a second embodiment of a break-out device according to the present invention.

The embodiment shown in FIG. 2 is largely similar to that of FIG. 1 except for the number and the spacing of the ribs 5. The embodiment of FIG. 2 has seven ribs 5 defining six channels 2 of a relatively small height. This embodiment may be preferred if only optical fibre elements having a small diameter are to be used. In case optical fibre elements having larger or varying diameters will be used, the embodiment of FIG. 1 is preferred. As can be seen in FIG. 1, the break-out device 1 of the present invention is capable of accommodating optical fibre elements of different diameters in a single device. By selectively inserting partitions, the through-holes can be made to the desired size. As the channels 2 are open to one side prior to the insertion of the portions, side entry and hence the installation of uncut optical fibre elements is possible.

Figure 3:
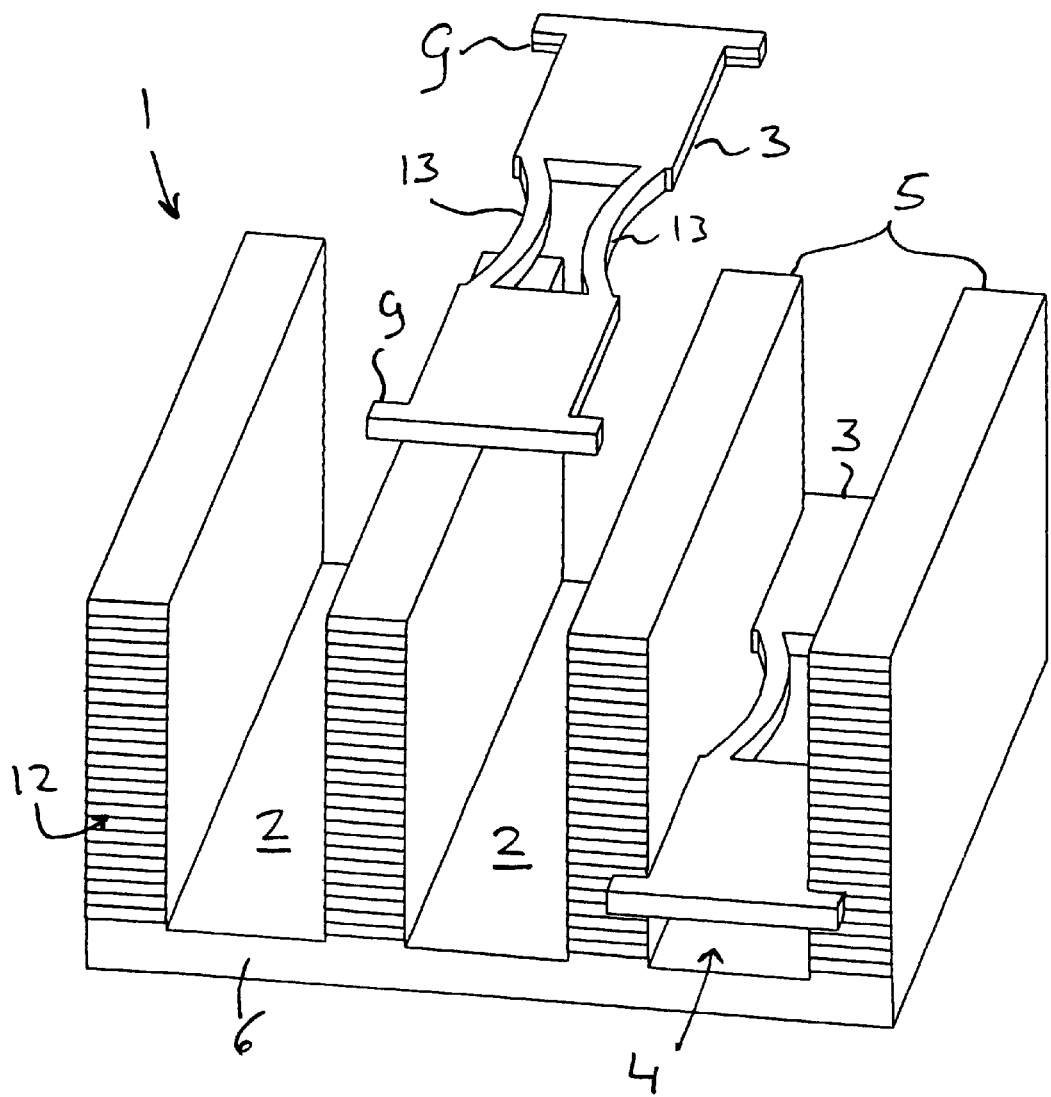
FIG. 3 shows, in perspective, a third embodiment of a break-out device according to the present invention.

The alternative embodiment of the break-out device 1 shown in FIG. 3 also comprises channels 2 defined by ribs 5 protruding from a base plate 6. The channels 2 are capable of accommodating partitions 3 so as to form through-holes 4. In this embodiment, however, the partitions 3 are not inserted in the longitudinal direction of the channels 2 but in their transverse direction. The locking mechanism comprises protrusions 9 which are engaged by a serrated front surface 12 of the ribs 5. This surface 12 is provided with teeth which are shaped to enable a downward movement (that is, towards the base plate 6) of partitions 3 but to resist an upward movement. To facilitate the insertion of the partitions 3 and to enable their removal they are provided with a resilient middle part constituted by two curved members 13. The resilience of this middle part allows the partitions to be slightly stretched and thus to become disengaged. Several partitions 3 may be accommodated in any one channel 2.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A break-out device for optical fibre elements, the device comprising a plurality of ribs protruding from a base plate, each pair of the ribs defining a channel for accommodating the optical fibre elements, the device further comprising one or more partitions insertable in a longitudinal direction of each channel so as to define through-holes having a substantially closed circumference, wherein sides of the ribs facing the channels are provided with slots for guiding the partitions and wherein a locking mechanism is provided for locking the partitions in their inserted positions.

2. A break-out device according to claim 1, wherein the locking mechanism is releasable.

3. A break-out device according to claim 2, wherein each partition is provided with at least one protrusion and each channel is provided with a recess or opening for accepting the protrusion in the inserted position.

4. A break-out device according to claim 3, wherein each partition is provided with a slit in a side near the at least one protrusion, the slit extending in the direction of the through-hole defined by the partition.

5. A break-out device according to claim 3, wherein the opening divides each channel into a slotted part and a non-slotted part.

6. A break-out device according to claim 1, wherein the channels, prior to the insertion of a partition, are open to one side.

7. A break-out device according to claim 6, wherein at least one channel is arranged for the insertion of at least two partitions so as to define at least two parallel through-holes.

8. A break-out device according to claim 1 further comprising mounting hooks for mounting the device on a support.

9. The break-out device of claim 1 wherein the one or more partitions are inserted in each channel longitudinally through an opening of the slots in an end face of the ribs.

10. break-out device of claim 1 wherein the locking mechanism is configured to limit longitudinal movement of the partitions.

11. A break-out device for longitudinally extending elements comprising:
 a base member;
 a pair of ribs extending from the base member that define a longitudinally extending channel configured to receive the longitudinally extending elements therebetween, wherein inner sides of each of the pair of the ribs include at least one longitudinally extending slot; and a removable partition inserted in the at least one slot of each of the pair of the ribs and extending longitudinally therein to provide a through-hole dimensioned to receive at least one of the longitudinally extending elements.

12. The break-out device of claim 11 wherein the removable partition further comprises a locking mechanism that retains the removable partition in the channel.

13. The break-out device of claim 12 wherein the locking mechanism comprises a releasable locking mechanism.

14. The break-out device of claim 11 wherein the ribs are substantially parallel and extend substantially transversly from the base member.

15. The break-out device of claim 11 further comprising mounting hooks coupled to the base member and configured to mount the break-out device on a support.

16. The break-out device of claim 11 further comprising at least one additional rib defining at least one additional longitudinally extending channel.

17. The break-out device of claim 11 wherein the inner face of one of the ribs includes a plurality of slots aligned with respective ones of a plurality of slots in the inner face of the other of the ribs to define a plurality of pairs of slots for receiving the removable partition to provide different through-hole dimensions.

18. The break-out device of claim 17 wherein the partition member further comprises a locking means for retaining the removable partition in the channel.

19. The break-out device of claim 11 wherein the removable partition is inserted in the channel longitudinally through an opening of the at least one slot of each of the pair of ribs in an end face of the ribs.

20. The break-out device of claim 12 wherein the locking mechanism is configured to limit longitudinal movement of the partitions.

21. A break-out device for longitudinally extending elements comprising:
   a base member;
   a pair of ribs extending from the base member that define a longitudinally extending channel configured to receive the longitudinally extending elements therebetween,; and
   a removable partition inserted in the channel and extending longitudinally therein to provide a through-hole dimensioned to receive at least one of the longitudinally extending elements, the partition including a locking mechanism that retains the removable partition in the channel.

22. The break-out device of claim 21 wherein the locking mechanism comprises at least one protrusion on the removable partition configured to be received in at least one opening, groove and/or recess in at least on of the ribs.

23. The break-out device of claim 22 wherein the at least one opening, groove and/or recess in at least on of the ribs comprises a serrated front surface on the ribs that defines teeth that receive the at least one protrusion on the removable partition.

24. The break-out device of claim 23 wherein teeth are shaped to enable downward movement toward the base member and resist upward movement away from the base member.

25. The break-out device of claim 23 wherein the removable partition further comprises a resilient middle part having a stretched state in which the at least one protrusion is disengage from the teeth and a relaxed stated in which the at least one protrusion engages the teeth.

26. The break-out device of claim 21 wherein the longitudinally extending elements comprise optical fibre cables.

27. A method for organizing optical fibre elements comprising:
   providing a break-out device having a base member and a pair of ribs extending from the base member that define a longitudinally extending channel configured to receive the optical fibre elements therebetween, wherein the inner face of one of the ribs includes a plurality of slots aligned with respective ones of a plurality of slots in the inner face of the other of the ribs to define a plurality of pairs of slots;
   determining a desired through-hole dimension for receiving a selected one of the optical fibre elements;
   selecting one of the plurality of pairs of slots based on the desired through-hole dimension;
   inserting a removable partition in the selected one of the plurality of pairs of slots to provide a through-hole in the channel having the desired through-hole dimension; and inserting the selected one of the optical fibre elements into the through hole.

* * * * *